Aug. 19, 1969         J. J. RIGA         3,462,243
PROCESS AND BURNER FOR THE CONVERSION OF AMMONIA
INTO OXIDES OF NITROGEN
Filed Nov. 13, 1967

INVENTOR
JEAN JOSEPH RIGA
BY
ATTORNEY 3,462,243
PROCESS AND BURNER FOR THE CONVERSION
OF AMMONIA INTO OXIDES OF NITROGEN
Jean Joseph Riga, Liege, Belgium, assignor to Societe
Belge de l'Azote et des Produits Chimiques de Marly,
S.A., Ougree, Belgium
Filed Nov. 13, 1967, Ser. No. 682,202
Int. Cl. C01b 21/26; B01j 9/04
U.S. Cl. 23—162                                        5 Claims

ABSTRACT OF THE DISCLOSURE

Method and apparatus for converting ammonia into into oxides of nitrogen by forming a mixture of ammonia and an oxidizing gas into a plurality of streams, passing the streams through a catalytic mesh and reducing the pressure of the resultant gas.

The present invention relates to a method for the catalytic conversion of ammonia into oxides of nitrogen as well as apparatus which is used for effecting this conversion.

In the course of the catalytic oxidation of ammonia, various reactions may take place, the predominant reaction is, however, the one which leads to the formation of NO according to the following equation:

$$NH_3 + 5/4 O_2 \rightarrow NO + 3/2 H_2O + 54 \text{ kcal.}$$

which is highly exothermic.

In the presence of a platinum catalyst the oxidation of ammonia into nitric oxide takes place at a temperature of 750° C. to 900° C. in $10^{-4}$ to $10^{-3}$ sec.

As the price of the raw materials constitutes the main component of the cost of production, it is clear that the effectiveness of the conversion of the ammonia plays a very important role in the economics of the method.

The effectiveness of the oxidation of ammonia into nitric oxide depends on several factors. It can therefore be assumed that for a given catalyst and a given pressure of oxidation, the yield in nitric oxide for a given mixture of ammonia and air will depend more particularly on the following factors:

(a) Homogeneity of the mixture;
(b) Evenness of the distribution of the mixture on the catalyst mesh;
(c) Speed of the passage of the mixture through the catalyst mesh;
(d) The absence of convection currents or eddies, which could cause a part of the nitric oxide formed below the catalyst mesh to rise above this mesh.

The catalyst is produced in the form of meshes, cloths, or nets of platinum or alloys rich in platinum.

It is necessary for the economics of the method that the consumption of platinum, per ton of nitric acid formed, is as low as possible. It is one of the conditions to be observed for the avoidance of loss of activity in the catalyst that both mechanical and thermic stresses of the catalyst meshes should be avoided.

The method and apparatus according to the present invention make it possible to realize the above conditions.

The method consists broadly in that a homogeneous mixture of ammonia and air is fed onto the catalyst mesh and then the oxidation gas leaving the catalyst mesh is subjected to a pressure (loading) loss. Preferably the gaseous mixture of ammonia and air is divided into a plurality of parallel currents before the passage through the catalyst.

According to another aspect of the invention, a vertical converter is used for carrying out the above method, the gases flowing from top to bottom in the converter which contains a catalyst mesh carried by a shape-retaining, heat-resistant support which is provided with channels in the shape of jets and which has on the side facing the catalyst mesh a minimal surface between the adjacent channels. The converter further contains a perforated metal sheet and/or a metal grill above the catalyst mesh.

Figure 1:
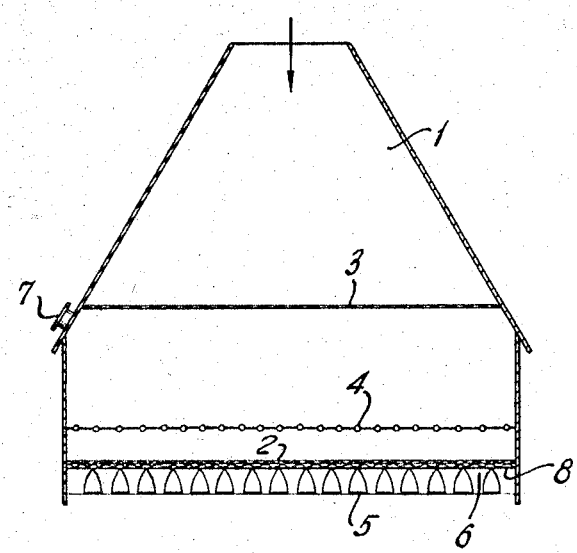
Figure 2:
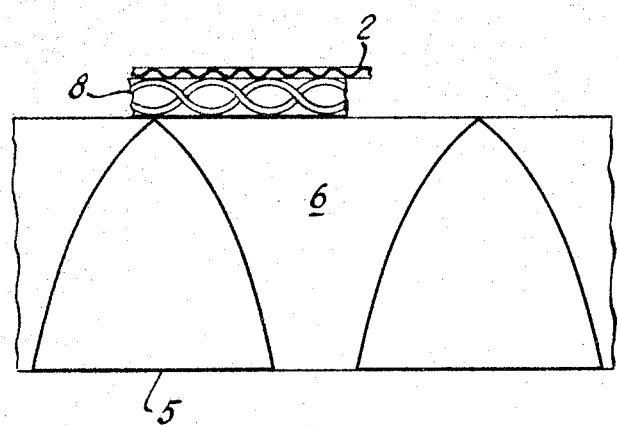

One embodiment of the present invention will now be described, by way of example, with reference to the accompanying drawings in which:

FIGURE 1 is a vertical section through an ammonia converter in which one method according to the invention may be performed; and FIGURE 2 is an enlarged view of a fragmentary portion of FIGURE 1.

This converter consists of a chamber 1 in the shape of a diffuser for feeding a gaseous reaction mixture of ammonia and air into the catalyst mesh 2 of platinum. The converter is arranged with its axis vertical for flow of the gaseous currents from top to bottom.

A perforated metal sheet 3 is located, at a suitable distance, of about ⅓ to ¼ the diameter of the catalyst mesh, above the catalyst mesh and is welded directly onto the wall of the diffuser.

A metal sheet about 2 mm. thick may be used, for example, as the sheet 2 and may have holes of 2 mm. across which are arranged about 6–7 mm. apart. An inlet 7 is located at the same height as the perforated metal sheet 2. A metal grill 4 is disposed between this metal sheet 2 and the layer of catalyst meshes, the said grill consisting, for example, of wire having a diameter of 2 mm. and the distance between the wires being 6 mm.

The metallic grill 4 is preferably disposed in the vicinity of the catalyst mesh for example at a distance above the catalyst mesh equal to about ¹⁄₁₀ of the diameter of the catalyst mesh.

These catalyst meshes of platinum or of an alloy on a platinum base rest on a shape-retaining, heat-resistant support 5, which is provided with channels 6 in the shape of jets. The upper surface of this support comprises sharp edges located between the mouths of the jets. To avoid wear and tear on the catalyst mesh 2 by rubbing or contact with the sharp edges of the heat-resistant support 5, a wide mesh metal grill 8 is inserted between the mesh and the support which grill has as small a horizontal surface as possible. The grill 8 having twisted meshes is preferably used as is shown in FIGURE 2.

A mixture of ammonia and air is fed through the point of the diffuser 1, the ammonia content of the mixture lying between 9.5 and 11.5 percent by volume. This mixture, which may be preheated up to about 150° C.–200° C., is under a pressure which can lie between atmospheric pressure and 10 atmospheres.

The gas mixture passes in sequence through the apertures of the perforated metal sheet 3 and then the metal grill 4 in such a way that on arrival on the catalytic meshes 2, the homogeneous mixture of ammonia and air is divided into a plurality of parallel streams moving at the same speed and thereby a homogeneous impact on the catalytic meshes takes place with a minimum of turbulence.

The oxidation of the ammonia takes place on contact with the catalyst and due to the exothermic reaction, the temperature rises in the downward direction seen from the catalyst and reaches a value which is largely dependent on the ammonia content of the reaction mixture.

The gas containing nitric oxide which has been formed by the catalytic oxidation of the ammonia passes through the channels 6 which are present in the shape of jets in the heat-resistant support 5. On leaving the converter, the gas is normally passed through a heat exchanger for recovering the heat generated by the reaction.

By reason of the following features, namely, (a) Homogeneous, even distribution of the gaseous mixture of ammonia and air on the catalytic mesh by means of the perforated metal sheet and of the metal grill;
(b) Progressive alteration of the cross-section of the channels, which pass through the heat-resistant support, minimal horizontal surface of the support is presented to the gas downwardly; and
(c) Pressure (loading) losses, which the oxidation gases encounter as soon as they are formed;

it has been found that no eddy or damming currents form in the gaseous mixture which arrives at the catalyst and no convection currents form in the oxidized gas causing movement of gas up into the diffuser, despite the considerable difference between the temperatures which are present above and below the catalytic mesh.

It has been observed in the present apparatus that in the absence of the metal grill 4, the gas current arriving at the catalytic mesh contained a damming current tending to block the flow of gas, and the rate of delivery of the gas consequently varied.

This also manifested itself by an uneven color of the catalytic meshes which showed that hotter and cooler zones were present. This leads to thermal stresses and rapid deterioration of these meshes. In this way increased catalyst losses were experienced as well as a decrease in the yield in the oxidation of ammonia into nitric oxides.

If, on the other hand, heat-resistant blocks or similar devices having a certain horizontal reflection surface are used as the support for the catalytic meshes, then an uneven distribution of the mixture of ammonia and air results. Convection currents are formed, a part of the nitric oxide formed rising into the diffuser and these forming with the ammonia, ammonium nitrate and/or ammonium nitrite. These salts are then carried by the gas current onto the catalytic meshes where they dissociate and cause a progressive decrease in the activity of the catalyst.

The following description serves to give details of one particular process according to the invention.

1700 kg./h. ammonia in the form of a mixture containing 10.5 percent by volume of ammonia and 89.5 percent by volume of air is fed into a diffuser which has at the point an angle of inclination of 60°. This mixture has a temperature of about 140° C. and a pressure of 3 atmospheres. This mixture is passed through the perforated metal sheet 3 which is welded directly onto the wall of the diffuser. This metal sheet, 2 mm. thick and having 2 mm. holes 6 mm. apart, is located 0.65 m. above the catalyst meshes 2. The gaseous mixture is then passed through the metal grill 4, which consists of wire 2 mm. in diameter and with distances of 6 mm. between the wires of the mesh and which is located 0.20 m. above the catalytic meshes.

The catalytic meshes having a diameter of 2 m. rest on a heat-resistant support 50 mm. thick which is provided with channels 6 which have a width of 60 mm. at the upper end and of 15 mm. at the outlet, a grill 8 having twisted meshes being inserted between the cloths and the support.

The homogeneous gas mixture fed in at the top of the diffuser is divided into a plurality of parallel streams having an even speed of about 0.75 m./sec. by being passed through the metal plate 3 and the grill 4. On contact with the catalytic meshes the ammonia is oxidized and the temperature rises to about 850° C. The nitrous gases thus formed have a speed of about 2.75 m./sec. and suffer on passage through the jet-shaped channels 6 a pressure loss, whereupon the speed reaches about 45 m./sec.

Due to the absence of heterogeneity in the gas mixture subjected to catalysis, the oxidation of the ammonia to nitric oxide can reach a yield of 96 percent or even exceed this, the yield being a function of the ammonia content in the mixture of ammonia and air.

If on the contrary one operates in the absence of the device (metal plate 3 and grill 4) which divides the gaseous mixture into streams or if the heat-resistant support described above is omitted, then a significant fall in the yield in the region of 10 percent is brought about.

In the process according to the invention the losses of platinum are very slight and lie considerably below 100 mg. per ton of nitric acid produced.

What is claimed is:

1. The method for conversion of ammonia into oxides of nitrogen by catalytic oxidation in the presence of a catalyst comprising the steps of directing an homogeneous mixture of ammonia and air vertically, dividing said mixture into a plurality of parallel streams having substantially uniform velocities, directing said stream through a catalyst and immediately thereafter subjecting the reacted gases to a static pressure loss.

2. Apparatus for converting ammonia into oxides of nitrogen utilizing the method of claim 1 and comprising a vertically disposed chamber having an opening at the top for the introduction of a mixture of ammonia and air and a bottom opening, means within said chamber for forming said mixture into a plurality of streams of substantially uniform velocities to develop laminar flow, a perforate catalytic element within said chamber disposed below said stream forming means and pressure reducing means immediately below said element for reducing the static pressure of the gases emerging from said catalytic element.

3. Apparatus according to claim 2, wherein said stream forming means comprises a perforated metal plate and a metal grill, supported in spaced relation to each other and above the catalyst element.

4. Apparatus according to claim 3, wherein said stream forming means comprises a perforated metal plate and a metal grill and wherein said catalytic element is supported by said pressure reducing means, the latter having a plurality of tapered narrowing openings forming convergent jets in the direction of flow of gas and being formed of a heat resistant material.

5. Apparatus according to claim 4 wherein said pressure reducing means is disposed in close proximity to said catalytic element and a metal grill is disposed between said element and pressure reducing means to support said element.

References Cited
UNITED STATES PATENTS

| | | | |
|---|---|---|---|
| 1,722,339 | 7/1929 | Pauling | 23—162 |
| 2,103,672 | 12/1937 | Heraeus | 23—162 X |
| 2,276,229 | 3/1942 | Dixon | 23—162 |

OSCAR R. VERTIZ, Primary Examiner

G. O. PETERS, Assistant Examiner

U.S. Cl. X.R.

23—288